Jan. 19, 1943.  W. P. PLACE  2,308,894
BRAKE CONTROL MEANS
Filed March 29, 1941
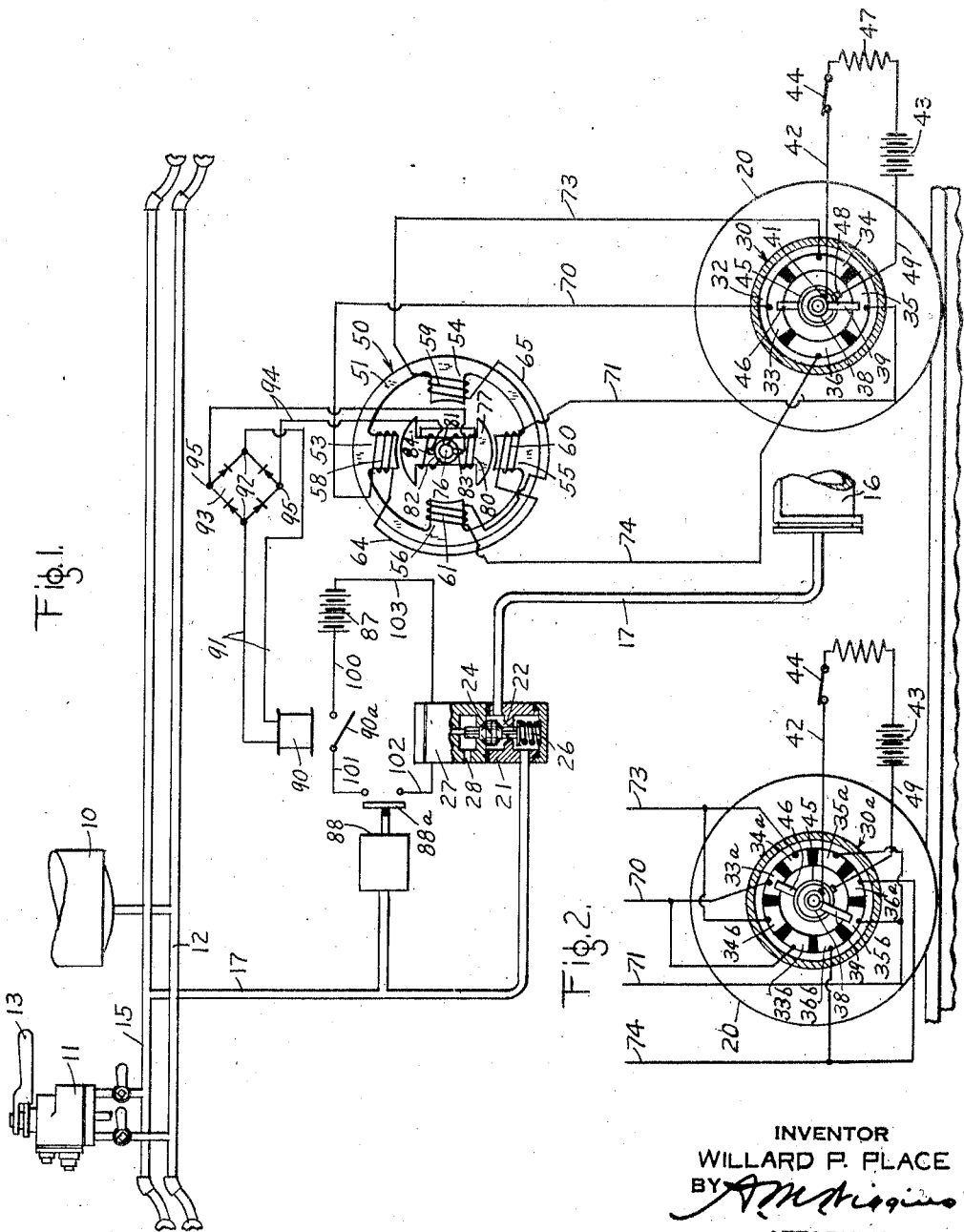
INVENTOR
WILLARD P. PLACE
BY *A. M. Higgins*
ATTORNEY Patented Jan. 19, 1943

2,308,894

UNITED STATES PATENT OFFICE 2,308,894

BRAKE CONTROL MEANS

Willard P. Place, Wilkinsburg, Pa., assignor to The Westinghouse Air Brake Company, Wilmerding, Pa., a corporation of Pennsylvania Application March 29, 1941, Serial No. 385,890

8 Claims. (Cl. 303—21)

This invention relates to brake controlling apparatus, and more particularly to an anti-wheel-slide control equipment of the electro-inertia type.

In order to promote maximum braking efficiency and full utilization of available braking power in the operation of modern high speed trains, it has been proposed to equip railway vehicles with braking systems including automatic anti-wheel-slide control means designed to respond to initial slipping of an excessively braked wheel for effecting momentary release of the associated brakes. As is generally understood, the slipping of a wheel occurs when the speed of rotation thereof is reduced below that corresponding to the vehicle speed, or in other words, when the wheel is caused to decelerate at a faster rate than that of non-slipping wheels. In its usual form, the anti-wheel-slide control apparatus is constructed and arranged to restore the rotative speed of a slipping wheel to that corresponding to the speed of the vehicle in time to prevent locking of the brakes and consequent sliding of the wheel along the rail.

In the United States Patent 2,039,701, issued May 5, 1936, to R. J. Bush, and assigned to the assignee of the present application, there is disclosed an electro-inertia responsive brake control device having certain characteristics of an induction generator, and comprising a plurality of field poles carried by a rotary element that is driven at the speed of a vehicle driving shaft, and a rotor journaled in the rotary element and carrying a winding in which a current can be generated when the rotor overruns the field poles in response to excessive deceleration of the associated wheel. According to the patent, the wound rotor is designed to operate at synchronous speed with respect to the mechanically rotated field poles under normal braking conditions, and the inertia of the rotor will cause it to slip with respect to the field poles, and thus to generate a current for actuating suitable brake release means, only when the rotary field element is decelerated at a rate indicating slipping of the wheel along the rail. It is desirable to provide for individual control of the braking force applied to each axle of a vehicle, and this result might be achieved by mounting a brake controlling generator device of the above type on the journal box at one end of each axle, so that a direct drive connection could be established between the axle and the rotor of the device. However, all of the elements of the control device would in such case be subjected to the constant pounding and vibration transmitted through the vehicle wheels to the unsprung portions of the truck frame. As a result of continuous shock thus encountered under operating conditions, the necessarily delicate windings and connections of the rotor, and the several supporting bearings as well, might be prevented from serving a desirably long service life.

It is a principal object of my invention to provide an improved electroresponsive brake control device of the above type, which comprises a commutator mechanism of simple and sturdy construction mounted on a journal box, and a separate rotary induction device adapted to be carried in a remote position on the spring supported body of the vehicle, the latter device being operative through the medium of an electrically revolving field controlled by the commutator device.

Another object of the present invention is to provide an improved electro-responsive brake control means comprising a rotary induction device adapted to be mounted in any convenient, relatively shock free location on a vehicle and operative for producing current to operate suitable brake release means, and having associated therewith an auxiliary rotary contact mechanism or commutator of simple, lightweight construction, which is operable by the wheel and axle assembly for distributing energizing current to the windings of the rotary induction device at a frequency corresponding with wheel speed.

Another object of the invention is to provide an improved electro-inertia responsive deceleration and acceleration control mechanism of the class described, in which a rotating field is produced entirely by electrical means at a frequency determined by the speed of rotation of the associated wheel.

It is a further object of the invention to provide an acceleration or deceleration control apparatus including a driving member, electrical means for establishing a revolving magnetic field at a frequency corresponding with the speed of the driving member, a rotor arranged to operate therein at synchronous speed under normal conditions, a winding carried by the rotor and adapted to supply current to a control circuit in response to slip of the rotor under the force of inertia, and means responsive to current in the control circuit for correcting the rotating condition of the driving member.

Other objects and advantages of the invention will appear in the following more detailed description thereof, taken in connection with the accompanying drawing, in which Fig. 1 is a diagrammatic view of an elementary type of fluid pressure brake equipment with which is associated a preferred form of brake control means constructed in accordance with my invention, and Fig. 2 is a fragmentary diagrammatic view of a modified form of commutator which may be used in place of that shown in Fig. 1.

*Embodiment shown in Fig. 1*

In Fig. 1 of the drawing, a simplified form of air brake system for a vehicle is illustrated diagrammatically, and comprises a main reservoir 10, a self-lapping brake valve device 11 which is connected with the reservoir 10 by way of a supply pipe 12 and which is operative in accordance with movement of a handle 13 to supply air at a selected pressure to a straight-air pipe 15, and a brake cylinder device 16 which communicates by way of a branch pipe 17 with the straight air pipe. The brake cylinder device 16 is operative to apply braking pressure to a vehicle wheel and axle assembly 20 through the medium of the usual friction brake elements, not shown.

Interposed in the branch pipe 17 is a magnet valve device 21 comprising a casing having a valve chamber 22, which communicates at all times with the portion of the pipe 17 leading to the brake cylinder 16, and which contains a double beat valve 24 adapted to control communication to the valve chamber from the portion of the pipe 17 leading from the straight air pipe 15. The double beat valve 24 is normally held in an upper seated position, as shown, under the force of a spring 26, for maintaining communication between the straight air pipe and the brake cylinder, and is adapted for movement to a lower seated position in response to energization of a magnet 27 for connecting the chamber 22 to an atmospheric exhaust port 28, as will hereinafter be more fully explained.

According to the invention, the wheel and axle assembly 20 has associated therewith a commutator device 30, which may be mounted by suitable means, not shown, on a journal box adjacent the end of the axle, as indicated in the drawing, or may be mounted on the car truck and operatively connected by a flexible drive with the wheel and axle assembly. As illustrated in the drawing, the commutator device 30 comprises a casing structure disposed concentrically of the wheel 20 and having mounted therein an insulator block 32 supporting four arcuate metallic commutator segments 33, 34, 35 and 36, which are fixed at equally spaced positions about the axis of the wheel and axle assembly 20. A collector ring 38 is secured to and suitably insulated from the adjacent end of the axle of the assembly 20 and has formed thereon an outwardly extending contact arm 39, which is adapted to be moved into and out of engagement with the several commutator segments in succession, during rotation of the wheel and axle assembly. A brush 41, which may be mounted in a brush holder, not shown, is disposed in sliding contact with the ring 38 and is connected to a conductor 42 leading to the negative terminal of a battery or other source of direct current 43.

A similar collector ring 45 is secured to and insulated from the axle of the assembly 20, and carries a contact arm 46 which extends outwardly and is disposed diametrically opposite the arm 39. The contact arm 46 is thus adapted for engagement with each of the commutator segments 33, 34, 35 and 36 in succession, the two contact arms 39 and 46 being arranged for engagement with oppositely disposed commutator segments simultaneously. A brush 48 is mounted in sliding engagement with the collector ring 45 and is connected by means of a conductor 49 with the positive terminal of the battery 43. A normally closed cut-off switch 44 and resistor 47 may be interposed in series with the conductor 42, if desired.

The brake controlling means embodying the invention further comprises a rotary electro-inertia control device 50, which is preferably carried on the vehicle body at a point remote from the axle and is designed to have certain characteristics of both an induction motor and a synchronous motor. The control device 50 includes a casing 51, which is adapted to be mounted in any convenient location on the vehicle where vibration is at a minimum, and may be secured in place by rubber or spring supporting means, not shown. Mounted on the interior wall of the casing 51 are four equally spaced pole pieces 53, 54, 55 and 56, which carry field windings 58, 59, 60 and 61, respectively. The oppositely disposed field windings 58 and 60 are connected by means of a conductor 64, and are so wound as to produce opposite or north and south magnetic poles when energized, hereinafter explained. Similarly, the windings 59 and 60 are wound in the same direction and are connected by means of a conductor 65 in order to produce opposite poles depending upon the direction of the energizing current. In the form of the invention diagrammatically illustrated, the winding 58 is connected by means of a conductor 70 with the commutator segment 33, and the opposite winding 60 is connected by a conductor 71 to the commutator segment 35. In like manner the opposite windings 59 and 61 are respectively connected to the commutator segments 34 and 36 by means of conductors 73 and 74.

The casing 51 of the electro-inertia control device 50 is provided with suitable bearings, not shown, in which are journaled opposite ends of a shaft 76 which carries a rotor 77, which is shown in the drawing as being of bipolar form, and is disposed in concentric relation with respect to the four pole pieces carried by the casing. The rotor 77 is made of soft iron or a magnetic alloy, and is provided with a winding 80, the terminals of which are connected to suitably insulated collector rings 81 and 82 carried by the rotor, which rings are mounted in sliding engagement with stationary brushes 83 and 84, respectively.

The winding 80 carried by the rotor 77 is designed to have induced therein a control current which, within the scope of the present invention, may be utilized for initiating operation of any suitable type of brake release or rail sanding mechanism. One form of brake release control means is shown in Fig. 1 for the purpose of illustration, and includes the magnet valve device 21 previously described, a battery or other source of electrical energy 87, a pressure switch 88, and a magnetic relay 90, the control circuit for which includes a pair of conductors 91 connected to terminals 92 of a rectifier assembly 93, and a pair of conductors 94 which are connected respectively to terminals 95 of the rectifier assembly and to the brushes 83 and 84 of the electro-inertia control device 50. The pressure switch 88 may be of any suitable construction, and as illustrated is arranged for operation to its circuit closing position by the pressure of air supplied to the brake cylinder branch pipe 17 in effecting an application of the brakes.

Operation

When the vehicle carrying the equipment shown in Fig. 1 is set in motion, the wheel and axle assembly 20 begins to revolve and operates the commutator device 30 to distribute energizing current to the field windings of the electro-inertia control device 650, the windings being energized in sequence so as to establish a rotating field to which the rotor 77 is adapted to respond by rotating at synchronous speed. Assuming for example that the wheel and axle assembly 20 begins to rotate in a clockwise direction, as viewed in Fig. 1, upon engagement of the contact arms 39 and 46 with the commutator segments 35 and 33 current is fed through a circuit including the positive terminal of battery 43, conductor 49, brush 48, collector ring 45, contact arm 46, segment 33, conductor 70, the connected field windings 58 and 60, conductor 71, commutator segment 35, contact arm 39, collector ring 38, brush 41, and the conductor 42 together with switch 44 and resistor 47 leading to the negative terminal of the battery. With the pole pieces 53 and 55 thus energized as south and north poles, respectively, the flux thereby set up in the rotor 77 pulls that element into pole to pole alignment with the prevailing magnetic field to maintain the flux at a maximum. As the contact arms 46 and 39 are then brought into engagement with the next pair of commutator segments 34 and 36, respectively, the other set of field windings in the electro-inertia control device 50 are energized through a circuit including the commutator segment 34, which is now connected with the positive terminal of the battery 43, conductor 73, the connected field windings 59 and 61, conductor 74, and the commutator segment 36, which is connected with the negative terminal of the battery. It will be apparent that the windings 59 and 61 are thus energized to establish south and north poles, respectively, causing the rotor 27 to follow and to become aligned with the pole pieces 54 and 56.

Upon further rotation of the wheel and axle assembly to bring the contact arm 46 into engagement with the commutator segment 35 and contact arm 39 into engagement with the segment 33, current is this time supplied to the windings 60 and 58 in a direction to create north and south poles, respectively, thus establishing flux for exerting another impulse turning the rotor 77 in a clockwise direction. Similarly, engagement of the contact arms 46 and 39 with the commutator segments 36 and 34 effects reverse energization of the windings 61 and 59, it being apparent that as succeeding pairs of poles are energized in cycles corresponding with rotation of the wheel and axle assembly 20, a revolving magnetic field is thereby established, and that the rotor 77 will lock in step with the revolving flux to rotate at synchronous speed as determined by the rotary speed of the wheel and axle assembly.

As the rotary speed of the wheel and axle assembly 20 is increased, the frequency of the alternating current distributed by the commutator device 30 to the field windings of the electro-inertia device 50 is correspondingly increased, while the rotor 77, in continuing to revolve in synchronism with the revolving magnetic field, acquires momentum. It will be understood that so long as the rotor 77 is thus rotated at synchronous speed, no current will be induced in the winding 80, there being no slip or relative motion between the rotor and the revolving field. The rotor 77 and other elements of the electro-inertia control device 50 are so proportioned and arranged that the inertia of the rotor, when revolving within the speed range of the vehicle, will not prevent that element from remaining in step or at synchronous speed with respect to the revolving field under normal conditions of acceleration and deceleration thereof, in accordance with the varying speeds at which the wheel and axle assembly 20 is operated.

An application of the brakes may be effected by moving the handle 13 of the brake valve device 11 into the brake application zone, thereby operating the brake valve device to supply air under pressure to the straight air pipe 15 and thence through the branch pipe 17 and past the double beat valve 24 to the brake cylinder device 16. At the same time, the pressure switch device 88 is operated by the compressed air in pipe 17 and assumes its circuit closing position. If the braking power thus applied to the wheel and axle assembly 20 effects retardation thereof at a normal rate, so that the wheels continue to rotate at the speed of the vehicle without slipping, the force of the rotating flux exerted on the rotor 77 of the electro-inertia control device 50 continues to be sufficient to hold the rotor in step or at synchronous speed, as hereinbefore explained.

If the wheel and axle assembly 20 is braked too heavily, however, with the result that the wheel begin to slip and decelerate at an excessive rate, the relatively sudden change in the cycles of rotation of the magnetic field acting on the rotor 77 causes the rotor to pull out of synchronism or to overrun the revolving field. When relative motion between the rotor 77 and the revolving field thus occurs, an alternating current is induced in the winding 80, which current is transformed by the rectifier assembly 93 into direct current for energizing the coil of the relay 90.

The contact element 90a of the relay is thereby picked up for closing a circuit which includes the positive terminal of the battery 87, a conductor 100, the contact element 90a, a conductor 101, the contact element 88a of the pressure switch 88, a conductor 102, the magnet 27 of the magnet valve device 21, and a conductor 23 leading to the negative terminal of the battery. The magnet 27 is consequently energized for shifting the double beat valve 24 to its lower seated position, whereby the further supply of air under pressure to the brake cylinder 16 is cut off while the brake cylinder is vented to the atmosphere by way of the exhaust port 28. The braking force exerted by the brake cylinder device 16 is thus quickly withdrawn from the wheel and axle assembly 20, which is then free to resume a speed corresponding to that of the vehicle.

As the rotary speed of the wheel and axle assembly 20 is increased and approaches the vehicle speed, the correspondingly accelerated revolving field of the electro-inertia control device 50 will once again pick up the armature 77 and rotate it at synchronous speed. This action will be facilitated due to the fact that, since the winding 80 carried by the rotor 77 is connected in a closed circuit, any slip of the rotor with respect to the field will be accompanied by the production of flux in the rotor due to the induced current in the circuit, which flux in reacting with the revolving flux of the field will subject the rotor to a driving torque until it again approaches synchronous speed. It will be evident that the control device 50 may thus operate in the manner of a wound-rotor induction motor during starting and sudden acceleration, before the rotor locks into step with the field.

For certain installations of the brake controlling equipment, it may be found desirable to design and construct the relay 90 in such a manner as to provide it with a slow drop-out characteristic, in order to ensure energization of the magnet 27 of the magnet valve device for a sufficient interval to effect the desired release of the brakes, regardless of the time during which the relay may be actually energized by current induced in the winding 80 of the electro-inertia control device 50. It will of course be understood that after a slipping wheel condition has been corrected and the electro-inertia control device 50 has been returned to synchronous operation so as to prevent further flow of current in the circuit of the relay 90, the relay contact arm 90a will again be dropped to its circuit opening position for deenergizing the magnet 27, while the double beat valve 24 will be moved to its upper seated position to permit resupply of compressed air to the brake cylinder device 16.

*Embodiment shown in Fig. 2*

Since it is intended that the operating elements of the electro-inertia control device 50 be relatively small in size and of light weight construction, it may be desirable to so design the associated commutator mechanism as to effect operation of the rotor 77 at a speed greater than that of the associated wheel and axle assembly, thereby rendering the rotor operable to store considerable kinetic energy, inasmuch as kinetic energy is proportional to the square of the angular velocity. One means by which this result may be accomplished is illustrated in Fig. 2 of the drawing, in which a commutator mechanism 30a is provided as a substitute for the commutator mechanism 30 shown in Fig. 1. In the commutator mechanism 30a, the commutator segments are doubled in number, and comprise in clockwise order, segments 33a, 34a, 35a, 36a, 35b, 36b, 33b and 34b, with the contact segments bearing like numerals connected in pairs to the corresponding conductors 73, 70, 71 and 74, in the same manner as has been described in connection with Fig. 1. It will be evident that each rotation of the contact arms 46 and 39 will effect distribution of energizing current in two cycles to the field windings of the electro-inertia control device, which will therefore be operated at twice the speed of the wheel and axle assembly 20.

From the foregoing it will now be seen that a control apparatus constructed in accordance with my invention may be used for detecting and governing acceleration or deceleration of a rotating element such as a car wheel, and comprises a small axle driven commutator, and a separate, remotely disposed electro-inertia responsive control device which is adapted to be driven by alternating current distributed by the commutator device. The electro-inertia responsive control device, which may be carried on any spring supported member of the vehicle so as to be relatively free from vibration, is somewhat similar in construction to a two-phase wound-rotor induction motor and includes an inertia responsive rotor normally operable at synchronous speed, as determined by the frequency of the current distributed by the commutator device, during which time no voltage will be generated in the rotor winding. When the rotor is caused to overrun the revolving field electrically produced by the commutator device, by reason of deceleration of the associated vehicle wheel at the excessive rate resulting from slipping of the wheel, the resultant electric current induced in the rotor winding is supplied to relay means operative to initiate release of the brakes.

Although one embodiment of the invention and a modification thereof have been described in detail, it is not intended to limit the scope of the invention to those embodiments or otherwise than by the terms of the appended claims.

Having now described my invention, what I claim as new and desire to secure by Letters Patent, is:

1. A brake equipment for the wheel of a vehicle including electro-responsive brake control means operative to regulate the degree of braking force supplied to the wheel, and anti-wheel-slide means therefor comprising a synchronous motor mounted on a part of the vehicle remote from said wheel and having an inertia responsive wound rotor with a winding connected to said electro-responsive brake control means, and electrical alternator means mounted adjacent said wheel and operable thereby to supply alternating current to said motor at a frequency corresponding to the rotary speed of said wheel, said rotor being constructed and arranged to pull out of synchronous speed and to thereby generate current in said winding upon deceleration of said wheel at an excessive rate.

2. A brake equipment for the wheel of a vehicle including electro-responsive brake control means operative to regulate the degree of braking force applied to said wheel, and anti-wheel-slide means therefor comprising a synchronous motor mounted on a part of the vehicle remote from said wheel and and having an inertia-responsive wound rotor with a winding connected to said electro-responsive brake control means, and electrical alternator means mounted adjacent said wheel and operable thereby to supply alternating current to said synchronous motor for normally driving said rotor at the same speed as that of the wheel, said rotor being constructed and arranged to pull out of synchronous speed and to thereby generate current in said winding upon deceleration of said wheel at an excessive rate.

3. A brake equipment for the wheel of a vehicle including electro-responsive brake control means operative to regulate the degree of braking force applied to said wheel, and anti-wheel-slide means therefor comprising a synchronous motor mounted on a part of the vehicle remote from said wheel and having an inertia-responsive wound rotor with a winding connected to said electro-responsive brake control means, and electrical alternator means mounted adjacent said wheel and operable thereby to supply alternating current to said synchronous motor for normally driving said inertia responsive rotor at a higher speed than that of said wheel, said rotor being constructed and arranged to pull out of synchronous speed and thereby to generate current in said winding upon deceleration of said wheel at a rate corresponding to wheel slipping.

4. In a brake controlling equipment for a wheel of a railway vehicle, in combination, brake means associated with the wheel, means for effecting an application of the said brake means, electro-responsive means for also controlling the operation of said brake means, relay means responsive to current in a control circuit for energizing said electro-responsive means, and means for generating current in said control circuit in response to slipping of the wheel including an inertia responsive rotor having an auxiliary winding connected in said control circuit, stationary field winding means adapted to be energized by alternating current to produce a revolving field for normally driving said rotor at substantially synchronous speed, said rotor and field winding means being located on a part of the vehicle spaced from said wheel, and alternator means remote from said other elements and operable directly by the wheel to energize said stationary field winding means at a frequency corresponding to the rotative speed of said wheel, said rotor means being adapted to overrun said revolving field upon a sudden change in frequency.

5. In a brake control equipment for regulating the degree of application of the brakes on a wheel and axle assembly of a vehicle, the combination of electro-responsive control means including a normally deenergized control circuit, an electro-inertia device carried on the body of said vehicle in a position remote from said wheel and axle assembly, said device comprising a plurality of field windings and a magnetic rotor associated therewith, said rotor carrying an auxiliary winding that is connected to said normally deenergized circuit, a source of electric current, and a commutator device operably connected to the wheel and axle assembly and driven thereby for distributing current from said source to said field windings in sequence for establishing a revolving flux, whereby said rotor is normally operated at synchronous speed corresponding with the rotative speed of said wheel, said auxiliary winding being adapted to deliver an induced current to said control circuit when said rotor pulls out of step with said revolving field upon deceleration of said wheel at an excessive rate.

6. In a brake control system for a vehicle having a wheel, in combination: a binary electro-inertia control apparatus for detecting sudden deceleration of said wheel, said apparatus comprising electrical commutator means associated with the wheel for distributing current through a plurality of circuits, and remotely disposed electro-inertia mechanism including means energized by said current for producing an electrically revolving magnetic field having a frequency determined by the wheel speed, an inertia responsive rotor mounted within said field and normally operable thereby at synchronous speed, and a winding carried by said rotor; and electro-responsive brake control means adapted to be energized by current induced in said winding when the inertia of said rotor causes it to slip out of step with respect to said electrically revolving field.

7. In a wheel brake equipment, in combination, electro-responsive brake control means, a control circuit therefor, a source of alternating current including a commutator device driven by the wheel, and an electro-inertia responsive control device adapted to be mounted at a location remote from said commutator device and comprising a field winding responsive to the current supplied from said commutator device for producing a revolving flux, an inertia responsive rotor normally operable thereby at synchronous speed, and a winding on said rotor connected with said control circuit for generating current in response to slip of said rotor out of synchronous operation with respect to the rotating flux of said field winding.

8. In a brake control system for a vehicle having a wheel and braking means therefor, in combination: electro-responsive brake control means; a normally deenergized control circuit therefor; and a two-part deceleration control apparatus including an electrical device operatively connected with said wheel for delivering alternating current at a frequency proportional to wheel speed, and a separate rotary inertia device adapted to be carried on a portion of the vehicle remote from said wheel and thus relatively free from vibration thereof, said rotary inertia device including a field winding energized by said electrical device for establishing a magnetic field varying in accordance with wheel speed, and an inertia responsive rotor operative in said field and having a winding arranged to supply current induced therein to said control circuit in response to slip of said rotor out of step with said field under the force of inertia.

WILLARD P. PLACE.